United States Patent
Davenel et al.

(10) Patent No.: US 11,125,624 B2
(45) Date of Patent: Sep. 21, 2021

(54) INFRARED IMAGING DEVICE

(71) Applicant: SAFRAN ELECTRONICS & DEFENSE, Boulogne-Billancourt (FR)

(72) Inventors: Arnaud Davenel, Paris (FR); Bernard Ruocco-Angari, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/255,732

(22) PCT Filed: Jun. 26, 2019

(86) PCT No.: PCT/FR2019/051579
§ 371 (c)(1),
(2) Date: Dec. 23, 2020

(87) PCT Pub. No.: WO2020/002837
PCT Pub. Date: Jan. 2, 2020

(65) Prior Publication Data
US 2021/0255043 A1  Aug. 19, 2021

(30) Foreign Application Priority Data

Jun. 28, 2018  (FR) ...................... 1855861

(51) Int. Cl.
*G01J 5/08* (2006.01)
*H04N 5/33* (2006.01)
(Continued)

(52) U.S. Cl.
CPC ............. *G01J 5/0825* (2013.01); *G01J 5/061* (2013.01); *H04N 5/33* (2013.01); *G01J 2005/0077* (2013.01)

(58) Field of Classification Search
CPC .. G01J 5/0825; G01J 5/061; G01J 2005/0077; H04N 5/33
See application file for complete search history.

(56) References Cited

U.S. PATENT DOCUMENTS

| | | | |
|---|---|---|---|
| 6,410,916 B1 | 6/2002 | Jost et al. | |
| 9,423,341 B1* | 8/2016 | Jim | ........................ B64G 3/00 |
| 2021/0102840 A1* | 4/2021 | Hashmonay | ....... G01N 21/3518 |

FOREIGN PATENT DOCUMENTS

| | | |
|---|---|---|
| CN | 106706132 A | 5/2017 |
| CN | 107883345 A | 4/2018 |

(Continued)

OTHER PUBLICATIONS

CN-106706132-A, published May 24, 2017, with a machine translation.

(Continued)

*Primary Examiner* — David P Porta
*Assistant Examiner* — Meenakshi S Sahu
(74) *Attorney, Agent, or Firm* — Birch, Stewart, Kolasch & Birch, LLP.

(57) ABSTRACT

An infra-red imaging device comprising: a cryostat (4), an infra-red detector (6) arranged inside the cryostat (4) to receive an optical signal coming from outside the imaging device, a linear polarizer configured to polarize the optical signal along a variable direction of polarization, before the optical signal reaches the infra-red detector (6), the linear polarizer comprising: a first polarizing element (22) arranged outside the cryostat (4) and movable in rotation with respect to the cryostat (4), and a second polarizing element (24) arranged inside the cryostat (4) between the first polarizing element (22) and the infra-red detector (6) and fixed with respect to the cryostat (4).

9 Claims, 2 Drawing Sheets

(51) Int. Cl.
*G01J 5/06* (2006.01)
*G01J 5/00* (2006.01)

(56) References Cited

FOREIGN PATENT DOCUMENTS

FR 3083416 B1 5/2020
WO WO 2014/170670 A2 10/2014

OTHER PUBLICATIONS

CN-107883945-A, published Apr. 6, 2018, with a machine translation.
Written Opinion of the International Searching Authority and International Search Report, dated Oct. 2, 2019, for International Application No. PCT/FR2019/051579, with English translations.

* cited by examiner

INFRARED IMAGING DEVICE

FIELD OF THE INVENTION

This invention relates to an infra-red imaging device.

PRIOR ART

A known problem is that of solar reflections in images produced by imaging devices intended for outdoor use.

Imaging devices are for example described in the documents CN 107883945 A, WO 2014/170670, and CN 106 706 132 A.

To minimize the effect of such solar reflections, it is known to include in an imaging device a linear polarizer upstream of a detector. Specifically, a linear polarizer can eliminate, in an optical signal received by the device, a first component carrying solar reflections and allow a second component not carrying solar reflections to pass through, such that this second component is then received by the detector.

Of course, the direction of polarization of the first component is variable. Thus, to be sure of eliminating solar reflections in any situation, the linear polarizer is configured to polarize the optical signal received by the device along a variable direction of polarization, before the optical signal reaches the infra-red detector.

Moreover, an additional problem exists which arises in an infra-red imaging device that has a detector sensitive to infra-red wavelengths: the infra-red detector is liable to receive interference signals radiated by internal parts of the device itself, strong emitters at wavelengths to which the infra-red detector is sensitive. This degrades the signal-to-noise ratio of the detector.

To solve this additional problem, it is known to place the infra-red detector inside a cryostat. Such a cryostat maintains the environment of the detector at low temperature, typically at 80 Kelvins, which has the effect of attenuating the propagation of interference signals outside the field of view of the detector (this field of view having a limited solid angle).

However, the cryostat does not make it possible to completely eliminate interference signals, as these can still propagate in the field of view of the detector. These interference signals can therefore still be reflected off a face downstream of the linear polarizer facing the detector, then reach the detector by propagating in the field of view of the detector which is not protected.

It could thus be envisaged to place the linear polarizer with variable direction of polarization inside the cryostat, in order to make the reflected interference signals also be "cold".

However, this would mean increasing the dimensions of the cryostat, which would increase the cost of the infra-red imaging device.

Moreover, the inclusion of such a polarizer would be very complex to implement, as such a polarizer is generally mounted to be movable with respect to the detector. Ensuring such mobility inside a cryostat without deteriorating its hold performance at low temperature would be very complex.

SUMMARY OF THE INVENTION

An aim of the invention is to more effectively reduce solar reflections in images produced by an infra-red imaging device more effectively, without significantly increasing its cost and complexity.

Provision is hence made for an infra-red imaging device comprising:
a cryostat,
an infra-red detector arranged inside the cryostat to receive an optical signal coming from outside the imaging device,
a linear polarizer configured to polarize the optical signal along a variable direction of polarization, before the optical signal reaches the infra-red detector, wherein the linear polarizer comprises: a first polarizing element arranged outside the cryostat and movable in rotation with respect to the cryostat, and a second polarizing element arranged inside the cryostat between the first polarizing element and the infra-red detector and fixed with respect to the cryostat.

In the proposed device, the function of linear polarization with a variable direction of polarization is provided by two polarizing elements: the first polarizing element and the second polarizing element.

The mobility of the first polarizing element with respect to the second polarizing element makes it possible to make variable the direction of polarization of the linear polarizer formed by these two polarizing elements, which makes it possible to eliminate solar reflections from any optical signal received.

In addition, as the second polarizing element is arranged inside the cryostat, it is cooled. Hence, interference signals radiated by internal parts of the device and reflected by the second polarizing element become "cold" before reaching the detector, as if the second linear polarizer had been arranged in its entirety in the cryostat. As a consequence, the signal-to-noise ratio at the detector is not degraded.

As only the second polarizing element is arranged inside the cryostat, and this second polarizing element is not movable but fixed, this result is obtained for a reasonable extra cost of the device. Specifically, the movable part of the linear polarizer (namely the first polarizing element) is relocated to outside the cryostat, where its assembly is not restrictive since it is not in a place that must be kept at low temperature.

The imaging device according to the invention can further comprise the following optional features, taken alone or in combination when this is technically possible:
the first polarizing element is a half-wave plate;
the first polarizing element is movable in rotation with respect to the cryostat about an axis perpendicular to an incident surface of the infra-red detector through which the infra-red detector receives the optical signal;
the second polarizing element is at a distance from the infra-red detector;
which second polarizing element is attached to an incident surface of the infra-red detector;
the cryostat comprises a window arranged to make the optical signal enter inside the cryostat, and wherein the second polarizing element is attached to the window;
the second polarizing element is a linear polarizer having a fixed direction of polarization with respect to the cryostat;
the fixed direction of polarization is parallel to the incident surface of the infra-red detector.
the infra-red detector is sensitive to wavelengths belonging to the MWIR band.

DESCRIPTION OF THE FIGURES

Other features, aims and advantages of the invention will become apparent from the following description, which is purely illustrative and non-limiting, and which must be read with reference to the appended drawings wherein.

In all the figures, similar elements bear identical reference numbers.

DETAILED DESCRIPTION OF THE INVENTION

Figure 1:
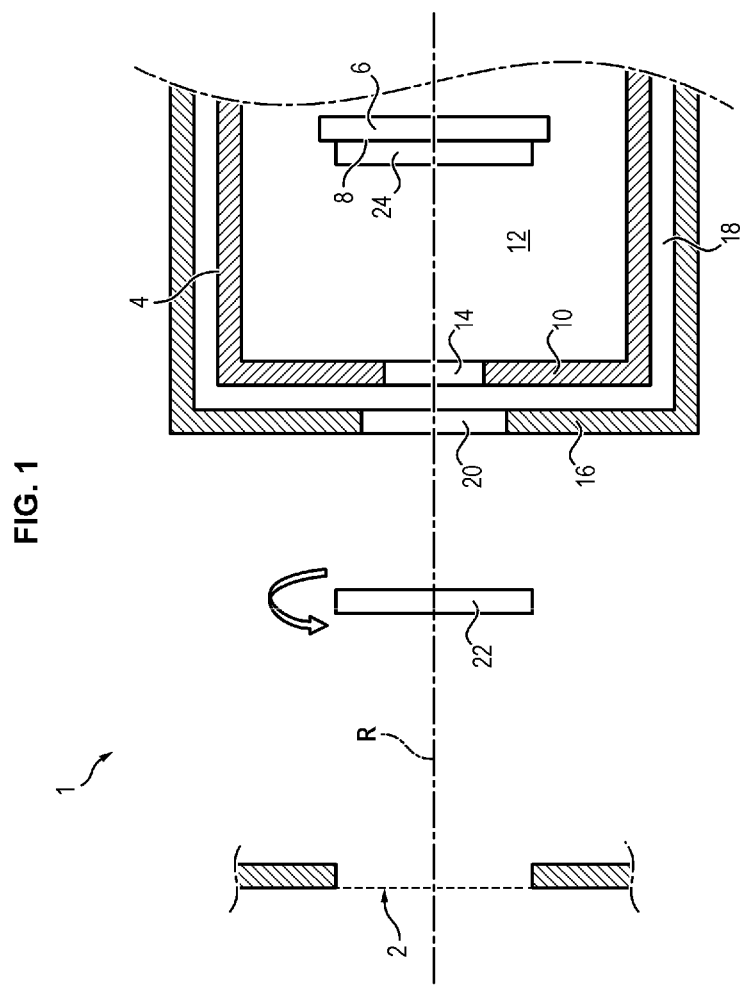
FIG. 1 schematically illustrates an infra-red imaging device according to a first embodiment.

With reference to FIG. 1, an infra-red imaging device 1 comprises an inlet 2, a cryostat 4 and an infra-red detector 6.

The inlet 2 of the device is able to receive an optical signal coming from outside the device.

The infra-red detector 6 is known per se. The detector 6 is a photodetector 6, having the function of converting the optical signal into an electrical signal that can then be used to generate an image.

The infra-red detector 6 in particular has an incident surface 8 through which the detector 6 receives the optical signal.

The infra-red detector 6 is sensitive to wavelengths belonging to the MWIR band.

The cryostat 4 comprises a wall 10 defining a chamber 12 intended to be kept at low temperature.

The wall 10 is for example made of metal or ceramic.

The infra-red detector 6 is arranged in this chamber 12.

The infra-red detector 6 is fixed with respect to the wall 10.

The wall 10 has a screen 14, referred to as "cold screen", able to be traversed by the optical signal coming from the inlet 2, in such a way that the optical signal can reach the infra-red detector 6 arranged in the chamber defined by the cryostat 4.

The infra-red imaging device further comprises a second wall 16 surrounding the first wall 10, the two walls 10, 16 being separated by a space 18 wherein a vacuum is formed.

The second wall 16 has a second screen 20, referred to as "hot screen" or "window", able to be traversed by the optical signal.

The two screens 14, 20 are arranged such as to be successively traversed by an optical signal coming from the inlet 2.

The infra-red imaging device 1 further comprises a linear polarizer.

The linear polarizer is configured to polarize along a variable direction of polarization the optical signal coming from the inlet 2, before the optical signal reaches the infra-red detector 6.

The linear polarizer with variable direction of polarization comprises two polarizing elements: a first polarizing element 22, and a second polarizing element 24.

In this text, a "polarizing" element is defined as an element that is able to modify the polarization of an optical signal received by this element.

The first polarizing element 22 is arranged outside the cryostat 4.

The first polarizing element 22 is arranged in the space 18 between the inlet 2 and the hot screen 20. Alternatively, the first polarizing element 20 is arranged between the hot screen 20 and the cold screen 14.

The first polarizing element 22 is movable in rotation with respect to the cryostat 4 about an axis of rotation R.

The axis of rotation R is perpendicular to the incident surface 8 of the infra-red detector 6.

The first polarizing element 22 is typically a half-wave plate.

In a manner known per se, the half-wave plate has a planar inlet surface 26 and a planar output surface 28 parallel to the inlet surface 2.

The axis of rotation R of the half-wave plate is perpendicular to the inlet 26 and output surfaces 28.

Moreover, the second polarizing element 24 is itself a linear polarizer. However, this linear polarizer has a fixed direction of polarization with respect to the cryostat.

The fixed direction of polarization defined by the second polarizing element 24 is parallel to the incident surface 8 of the infra-red detector 6.

The second polarizing element 24 is arranged in the cryostat 4, i.e. inside the chamber defined by the wall.

The second polarizing element 24 is arranged between the cold screen and the detector 6.

In the embodiment shown in FIG. 1, the second polarizing element 24 is attached to the incident surface 8 of the infra-red detector 6.

Figure 2:
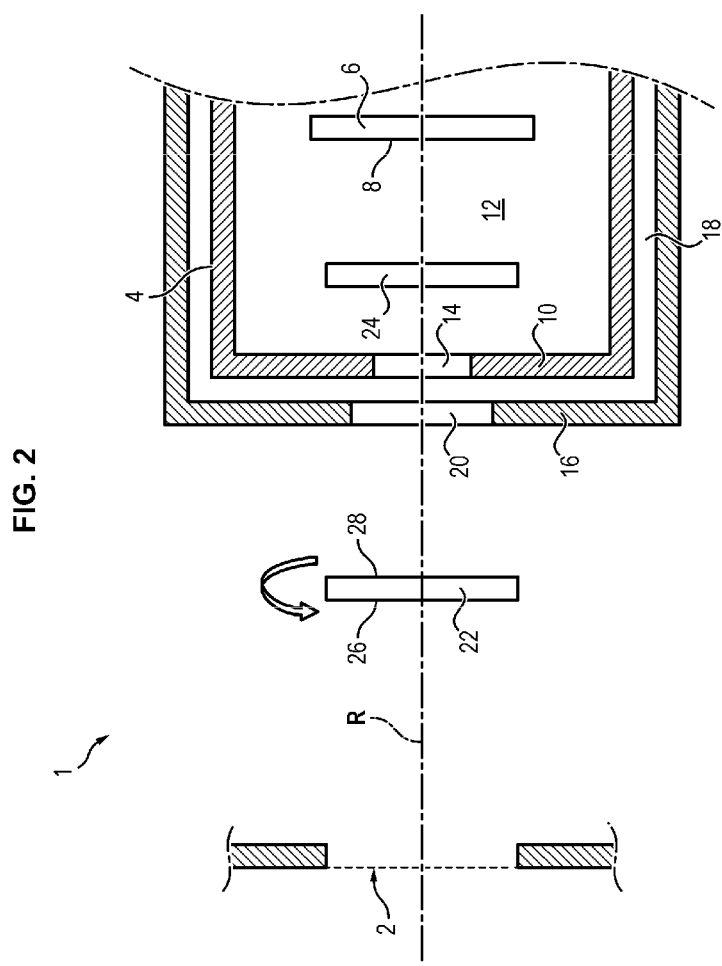
FIG. 2 schematically illustrates an infra-red imaging device according to a second embodiment.

In another embodiment, shown in FIG. 2, the second polarizing element 24 is at a distance from the infra-red detector 6. It is for example possible to envisage attaching this second polarizing element 24 to the cold screen 14.

In yet another embodiment, the second polarizing element is attached to the window 20.

The operation of the infra-red imaging device 1 is as follows. An optical signal enters the device through its inlet 2. This optical signal then traverses the first polarizing element 22, then the hot screen 20, then the cold screen 14, then the second polarizing element 24.

After traversing the two polarizing elements 22 and 24, the optical signal is polarized in a direction of polarization that is a function of the angular position of the first polarizing element 22 about the axis R, with respect to the second polarizing element 24.

This direction of polarization is parallel to the incident surface 8 of the infra-red detector 6. The optical signal thus polarized reaches the incident surface 8 of the infra-red detector 6.

The infra-red detector 6 converts the optical signal received into an electrical signal that can then be used to produce an image of a scene from which the optical signal comes.

By making the first polarizing element 22 turn about its axis of rotation R with respect to the second polarizing element 24, it is possible to change the direction of polarization of the linear polarizer formed by the two polarizing elements.

The linear polarizer eliminates the solar reflections present in the optical signal more or less, as a function of the angular position of the first polarizing element 22 with respect to the second polarizing element 24.

There is an optimal angular position of the first polarizing element 22 about the axis of rotation R wherein a component carrying solar reflections of the signal received by the inlet 2 is attenuated as much as possible.

For example, provision can be made for means allowing a user of the infra-red imaging device 1 to manually set in rotation the first polarizing element 22 about its axis R. Such means are particularly appropriate when the infra-red imaging device 1 is portable, such as a pair of binoculars.

The invention claimed is:

1. An infra-red imaging device comprising:
   a cryostat, an infra-red detector arranged inside the cryostat to receive an optical signal coming from outside the infra-red imaging device, a linear polarizer configured to polarize the optical signal along a variable direction of polarization, before the optical signal reaches the infra-red detector, wherein the linear polarizer comprises:

a first polarizing element arranged outside the cryostat and movable in rotation with respect to the cryostat, and a second polarizing element arranged inside the cryostat between the first polarizing element and the infra-red detector and fixed with respect to the cryostat.

2. The device according to claim 1, wherein the first polarizing element is a half-wave plate.

3. The device according to claim 1, wherein the first polarizing element is movable in rotation with respect to the cryostat about an axis perpendicular to an incident surface of the infra-red detector through which the infra-red detector receives the optical signal.

4. The device according to claim 1, wherein the second polarizing element is at a distance from the infra-red detector.

5. The device according to claim 1, wherein the second polarizing element is attached to an incident surface of the infra-red detector.

6. The device according to claim 1, wherein the cryostat comprises a window arranged to make the optical signal enter inside the cryostat, and wherein the second polarizing element is attached to the window.

7. The device according to claim 1, wherein the second polarizing element is a linear polarizer having a fixed direction of polarization with respect to the cryostat.

8. The device according to claim 7, wherein the fixed direction of polarization is parallel to the incident surface of the infra-red detector.

9. The device according to claim 1, wherein the infra-red detector is sensitive to wavelengths belonging to the MWIR band.

* * * * *